United States Patent [19]
Zaretsky

[11] Patent Number: 6,097,580
[45] Date of Patent: Aug. 1, 2000

[54] GFCI GROUND FAULT CURRENT FILTERING

[75] Inventor: Albert Zaretsky, Boynton Beach, Fla.

[73] Assignee: Leviton Manufacturing Co., Inc., Little Neck, N.Y.

[21] Appl. No.: 09/260,991

[22] Filed: Mar. 1, 1999

[51] Int. Cl.[7] .................................................. H02H 3/00
[52] U.S. Cl. ............................................. 361/42; 361/45
[58] Field of Search .................................. 361/42, 45, 87, 361/93.1, 93.6

[56] References Cited

U.S. PATENT DOCUMENTS

| | | | |
|---|---|---|---|
| 4,200,897 | 4/1980 | Dawley | 361/45 |
| 5,416,692 | 5/1995 | Shimizu et al. | 363/98 |
| 5,920,451 | 7/1999 | Fasano et al. | 361/45 |
| 6,025,980 | 2/2000 | Morron et al. | 361/42 |

Primary Examiner—Michael J. Sherry
Attorney, Agent, or Firm—Paul J. Sutton

[57] ABSTRACT

A system for controlling the response of a ground fault circuit interrupter in the presence of random leakage currents due to the presence of a conductive media such as water or ice. The signal from a magnetic core differential transformer is applied to two filters in parallel. The first filter passes the fundamental frequency of the source and the second filter passes a broad band of frequencies starting at twice the fundamental frequency. The output of the filters are applied to a microprocessor which manipulates the filter outputs and compares certain of the filter outputs to a stored pattern of expected current leakage. The microprocessor operates a relay to disconnect the load from the source when a fault condition exists.

15 Claims, 1 Drawing Sheet

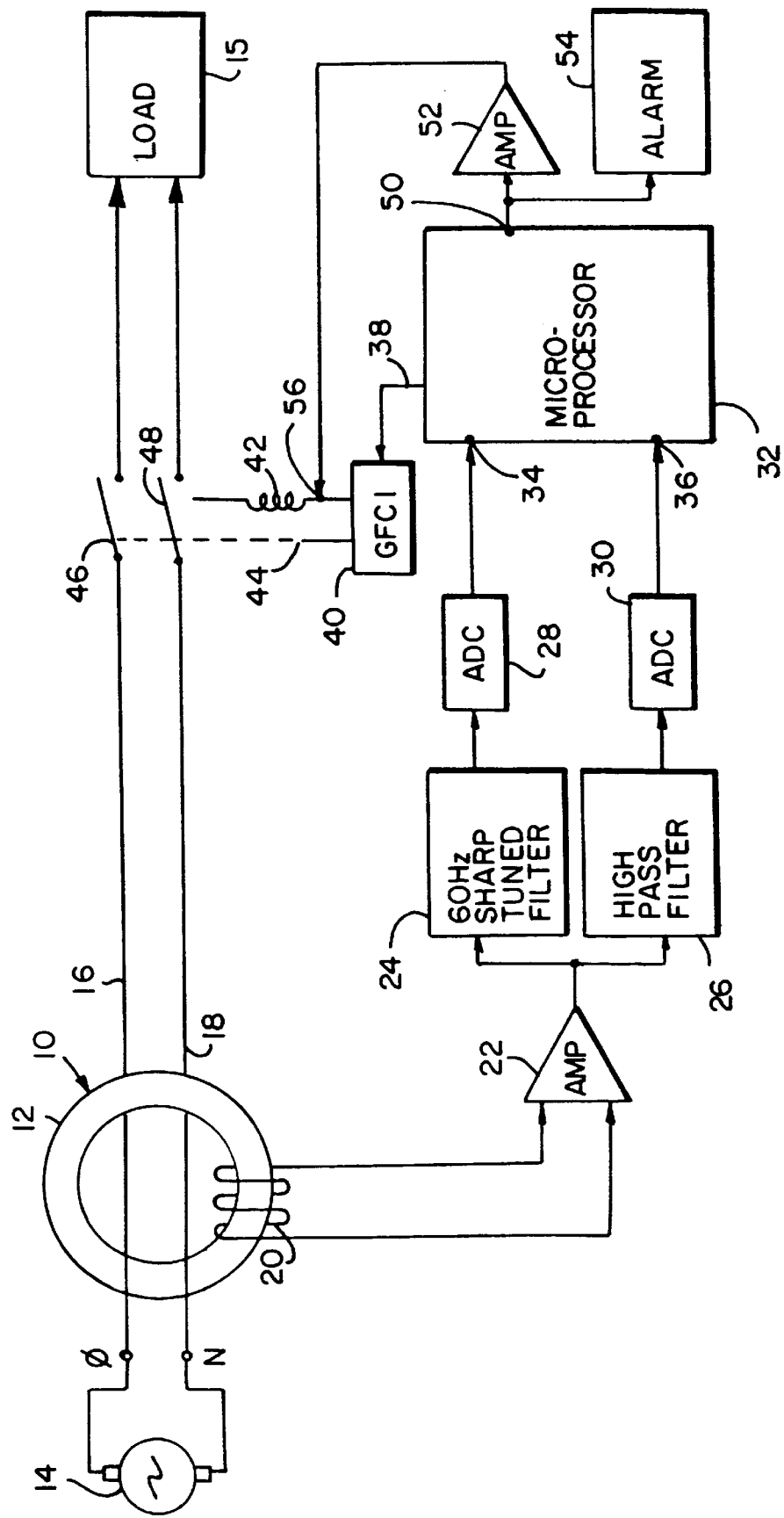

GFCI GROUND FAULT CURRENT FILTERING

BACKGROUND OF THE INVENTION

1. Field of the Invention

The invention is directed to the field of ground fault circuit interrupters (GFCIs) and more particularly GFCIs to protect electrical devices where there are normally erratic current leakages to ground.

2. Description of the Prior Art

There are some situations where the normal ground current leakage approaches or in some cases is greater than that required to trigger a GFCI. Two such examples are refrigerators and washing machines, where the leakages due to a water environment or melting ice cause erratic random ground leakages. In cases such as these, a conventional GFCI can not be used, thus compromising the safety of the user. No device is known which satisfactorily provides GFCI protection under these conditions.

SUMMARY OF THE INVENTION

The instant invention describes a new device which will facilitate accurate and correct triggering due to ground leakage in the presence of erratic and random ground leakage. A differential transformer detects imbalances in the current through the phase and neutral lines connecting a source to an electrical load. The output of the transformer is amplified and fed to two filters. A first filter is sharply tuned to pass only the fundamental frequency signal. The second filter is a band pass filter that has a lower cutoff in excess of twice the fundamental frequency to block the second harmonic and twice the fundamental frequency. The outputs of the filters are fed to analog to digital converters and are inputted to inputs of a microprocessor. The program of the microprocessor senses each of the two filter outputs separately and computes a moving average of each. The moving average time period is determined by the leaking characteristics of the appliance to be protected. When either average exceeds by a preset amount for a predetermined period of time, this signifies a ground leakage above the normal ground leakage, causing a trip signal to be generated which opens contacts in the phase and neutral lines thus separating the AC power source from the electrical load. It is an object of the instant invention to provide a GFCI which will provide proper triggering of the operating relay in the presence of erratic and random ground leakage.

It is another object of the instant invention to employ a microprocessor to compare ground leakage to a stored pattern of permitted ground leakage for a particular device.

It is yet another object of the instant invention to provide a device which can respond to abnormal ground leakage current while retaining the normal functions of a GFCI.

Other objects and features of the invention will be pointed out in the following description and claims and illustrated in the accompanying drawings, which disclose, by way of example, the principles of the invention, and the best mode which is presently contemplated for carrying them out.

BRIEF DESCRIPTION OF THE DRAWING

The sole FIGURE is a schematic diagram of the instant invention.

DESCRIPTION OF THE PREFERRED EMBODIMENT

A broadband differential transformer 10 in the shape of a toroid 12 receives therethrough a phase line 16 and a neutral line 18 from a source of AC power 14. The phase line 16 and the neutral line 18 each act as a single turn winding for the transformer 10. The differential transformer 10 frequency response band must be greater than the expected random ground leakage frequencies. A seconding winding 20 couples the differential signal to an amplifier 22. Amplifier 22 is coupled to the input of a 60 Hz sharp-tuned filter 24 which only passes the fundamental 60 Hz frequency. The amplifier 22 is also coupled to the input of a high pass filter 26 which has a band starting at a frequency above 120 Hz, twice the fundamental frequency so as to block the second harmonic and the fundamental which might be generated by switching loads each half cycle.

The output of filter 24 is applied to a first analog to digital converter 28 while the output of filter 26 is applied to a second analog to digital converter 30. The outputs of filters 24 and 26 are thus converted to a digital format and applied to input terminals 34 and 36, respectively of a microprocessor 32. The microprocessor 32 computes a moving average for each input at terminals 34 and 36. The moving average time period is determined by the leakage characteristics of the device to be protected. When either moving average exceeds a preset amount for a predetermined time period, this signifies a ground leakage above the normal ground leakage causing a trigger signal to be generated which opens the lines 16 and 18 as will be described below.

The microprocessor 32 also stores a pattern of the leakage characteristics of the devices to be protected and provides a trip signal in the event an abnormal ground leakage as indicated by no match between the stored pattern and the pattern of the applied waves such as may occur due to arcing or there is a high moving average signal.

Thus, if the moving average produced by the microprocessor 32 in response to the power line frequency signal applied at terminal 34, the normal GFCI ground fault, exceeds by a given amount and for a given period of time, a signal is applied to a GFCI 40 via output terminal 38. The GFCI, as is well known, has a control device such as a silicon controlled rectifier which responds to a fault current to operate the solenoid 42 (See U.S. Pat. No. 4,709,293 issued Nov. 24, 1987 and assigned to the assignee of the instant invention). The solenoid plunger 44 is attached to movable contact arms 46 and 48 to open the phase line 16 and the neutral line 18. When the signal is removed from the GFCI 40, the solenoid 42 is deactivated and the plunger 44 returns to a rest position (not shown) where the movable contact arms 46 and 48 move to their closed positions in contact with fixed contacts to close the phase line 16 and neutral line 18 between the AC power source 14 and an electrical load 15.

The signal applied to terminal 36, the erratic random ground leakage of a water operated appliance, of microprocessor 32 is evaluated to determine whether its moving average is above a limit stored in the memory of microprocessor 32. In the event the signal exceeds the limit for the moving average, an output signal is applied to an amplifier 52 from output terminal 50 of microprocessor 32. The output at terminal 50 can also be applied to an alarm 54 which can be a visual alarm such as a light, an auditory alarm such as a bell or buzzer or a combination of both. The signal at output terminal 50 could also be transmitted to a remote location (not shown). The output of amplifier 52 is applied to terminal 56 of solenoid 42 to cause the plunger 44 to open the movable contact arms 46, 48 and open the phase and neutral lines 16, 18 respectively.

The microprocessor 32 also compares the signal at terminal 36 with a stored current pattern in the memory of the microprocessor 32. The pattern stored is a typical current wave for the device being protected and includes the normal current and any expected current leakage which is typical of the device in operation. The incoming signal on input terminal 36 is cross-correlated with the stored program wave to determine leakage randomness. An arc can also be detected by the signal applied to the input terminal 36. The output terminal 50 provides a signal to amplifier 52 when the detected current pattern exceeds the stored current pattern by more than a given amount such as when arcing occurs. The output of amplifier 52 is applied to terminal 56 of the solenoid 42 as above described. More complex mathematical methods of waveform analysis could also be used, for example, least squares analysis, in place of the moving averages.

While there have been shown and described and pointed out the fundamental novel features of the invention as applied to the preferred embodiment, as is presently contemplated for carrying them out, it will be understood that various omissions and substitutions and changes of the form and details of the device illustrated and in its operation may be made by those skilled in the art, without departing from the spirit of the invention.

I claim:

1. A GFCI fault current filtering system, comprising:
    a) differential transformer having an aperture therethrough;
    b) a phase line passing through said transformer aperture and forming a first one turn winding on said transformer, said phase line coupled at a first end to the phase conductor of an AC power source and at a second end to the phase terminal of an electrical load;
    c) a neutral line passing through said transformer aperture and forming a second one turn winding on said transformer, said neutral line coupled at a third end to the neutral conductor of said AC power source and at a fourth end to the neutral terminal of an electrical load;
    d) a secondary winding on said differential transformer to provide a first signal when the current through said neutral line does not equal the current through said phase line;
    e) a first filter coupled to said secondary winding and tuned to pass a selected frequency signal of said first signal;
    f) a second filter coupled to said secondary winding and tuned to pass a band of selected frequencies signal of said first signal;
    g) a microprocessor coupled to said first filter to receive said selected frequency signal and compute a first moving average of said selected frequency signal and said microprocessor is coupled to said second filter to receive said band of selected frequencies signal and compute a second moving average of said band of selected frequencies signal; and
    h) selectively operable switch device in said phase and neutral lines and responsive to an output of said microprocessor to operate said selectively operable switch device to open said phase and neutral lines and interrupt the flow of current to an electrical load coupled to said load phase and neutral terminals.

2. A GFCI ground fault current filtering system, as defined in claim 1, further comprising:
    a) a wide band amplifier having input terminals to receive said first signal from said secondary winding on said differential transformer and a first output coupled to said first filter and said second filter.

3. A GFCI ground fault current filtering system, as defined in claim 1, further comprising:
    a) a first analog to digital converter with an input terminal coupled to said first filter and an output terminal coupled to said microprocessor to provide a digitized selected frequency signal to said microprocessor; and
    b) a second analog to digital converter with an input terminal coupled to said second filter and an output terminal coupled to said microprocessor to provide a digital band of selected frequencies signal to said microprocessor.

4. A GFCI ground fault current filtering system, as defined in claim 2 further comprising:
    a) a first analog to digital converter with an input terminal coupled to said first filter and an output terminal coupled to said microprocessor to provide a digitized selected frequency signal to said microprocessor; and
    b) a second analog to digital converter with an input terminal coupled to said second filter and an output terminal coupled to said microprocessor to provide a digitized band of selected frequencies signal to said microprocessor.

5. A GFCI ground fault current filtering system, as defined in claim 1, further comprising:
    a) a GFCI coupled to a first output terminal of said microprocessor and to said selectively operable switch device to operate said switch device to an open position when said first moving average exceeds a first predetermined value.

6. A GFCI ground for fault current filtering system, as defined in claim 2, further comprising:
    a) a GFCI coupled to a first output terminal of said microprocessor and to said selectively operable switch device to operate said switch device to an open position when said first moving average exceeds a first predetermined value.

7. A GFCI ground fault current filtering system, as defined in claim 1, wherein said selectively operable switch device receives an output of said microprocessor to operate said switch device when said second moving average signal exceeds a second predetermined value.

8. A GFCI ground fault current filtering system, as defined in claim 2, wherein said selectively operable switch device receives an output of said microprocessor to open said switch device when said second moving average signal exceeds a second predetermined value.

9. A GFCI ground fault current filtering system, as defined in claim 1, wherein said selectively operable switch device receives an output of said microprocessor to open said switch device when said band of selected frequencies signal does not match a signal stored in the memory of said microprocessor.

10. A GFCI ground fault current filtering system, as defined in claim 2, wherein said selectively operable switch device receives an output of said microprocessor to open said switch device when said band of selected frequencies signal does not match a signal stored in the memory of said microprocessor.

11. A method of operating a selectively operable switch device to open a phase line and a neutral line between a source of AC power and an electrical load, comprising the steps of:
    a) extending said phase line through an aperture of a magnetic core differential transformer;
    b) extending said neutral line through the aperture of said magnetic core differential transformer;

c) applying an output signal of said differential transformer to a first filter to select a first signal and to a second filter to select a second signal;

d) applying said first and said second signals to a microprocessor;

e) manipulating said first signal and said second signal in accordance with criteria stored in said microprocessor and providing a third signal; and f) providing an operating signal to said selectively operable switch device to cause switch device to open said phase and neutral lines in response to said third signal applied by said microprocessor to said operable switch device.

12. A method, as set forth in claim 11, further comprising the step of:

a) selecting said magnetic core differential transformer to have a broadband response in excess of any expected current leakage frequencies.

13. A method, as set forth in claim 12, further comprising the step of:

a) amplifying the output signal of said differential transformer.

14. A method, as set forth in claim 11, wherein:

a) said first filter passes a single frequency signal; and b) said second filter passes a band of frequencies.

15. A method, as set forth in claim 12, wherein:

a) said first filter passes a single frequency signal; and b) said second filter passes a band of frequencies.

* * * * *